(12) United States Patent
Kitchen et al.

(10) Patent No.: US 9,890,866 B2
(45) Date of Patent: Feb. 13, 2018

(54) HYDRANT SHEAR VALVE AND METHOD

(71) Applicant: KSJ VALVE COMPANY, LLC, Escondido, CA (US)

(72) Inventors: Richard T. Kitchen, Escondido, CA (US); Richard D. Traver, San Diego, CA (US)

(73) Assignee: KSJ VALVE COMPANY, LLC, Escondido, CA (US)

( * ) Notice: Subject to any disclaimer, the term of this patent is extended or adjusted under 35 U.S.C. 154(b) by 75 days.

(21) Appl. No.: 14/788,448

(22) Filed: Jun. 30, 2015

(65) Prior Publication Data

US 2016/0265197 A1    Sep. 15, 2016

Related U.S. Application Data

(60) Provisional application No. 62/131,222, filed on Mar. 10, 2015.

(51) Int. Cl.
| | |
|---|---|
| *F16K 27/00* | (2006.01) |
| *F16K 17/36* | (2006.01) |
| *F16K 17/40* | (2006.01) |
| *E03B 9/04* | (2006.01) |

(52) U.S. Cl.
CPC ............. *F16K 27/006* (2013.01); *E03B 9/04* (2013.01); *F16K 17/363* (2013.01); *F16K 17/40* (2013.01)

(58) Field of Classification Search
CPC ...... F16K 17/40; F16K 17/363; F16K 27/006; E03B 9/04
USPC .......................................... 137/68.11
See application file for complete search history.

(56) References Cited

U.S. PATENT DOCUMENTS

| | | |
|---|---|---|
| 4,127,142 A | 11/1978 | Snider |
| 4,361,165 A | 11/1982 | Flory |
| 5,609,179 A | 3/1997 | Knapp |
| 6,401,745 B1 | 6/2002 | Corder |
| 2005/0224114 A1 | 10/2005 | Cook et al. |
| 2015/0240962 A1* | 8/2015 | Plummer ................ F16K 17/40 137/300 |

* cited by examiner

*Primary Examiner* — Craig Schneider
*Assistant Examiner* — P. Macade Nichols
(74) *Attorney, Agent, or Firm* — Jonathan L. Pettit; Duckor Spradling Metzger & Wynne

(57) ABSTRACT

A system and method are disclosed for shutting off the flow of liquid to a hydrant. A break away frangible activator of a valve body becomes dislodged responsive to a hydrant receiving sufficient inadvertent impact. A valve member closes in response to the impact to close off the flow of fluid to the hydrant.

16 Claims, 10 Drawing Sheets

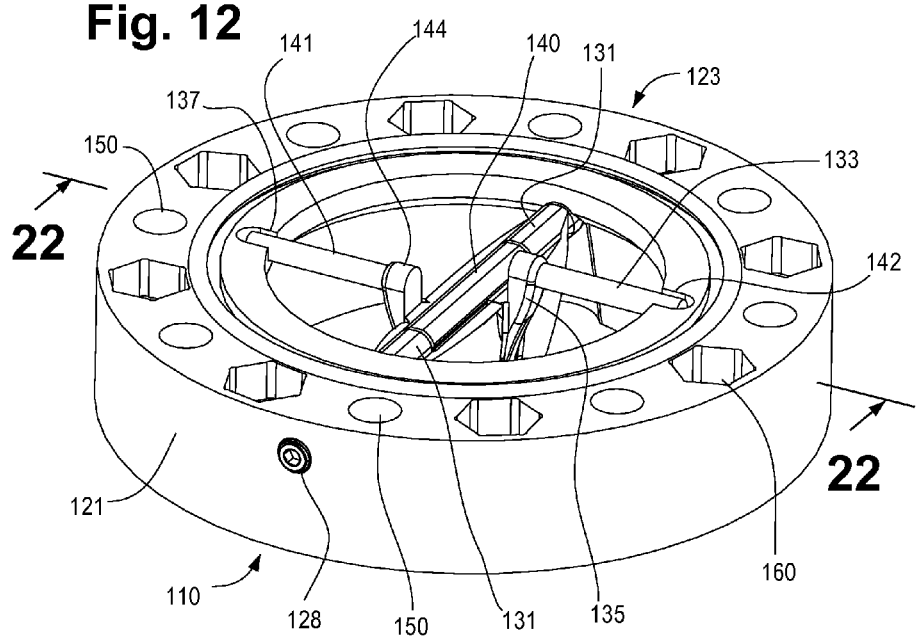
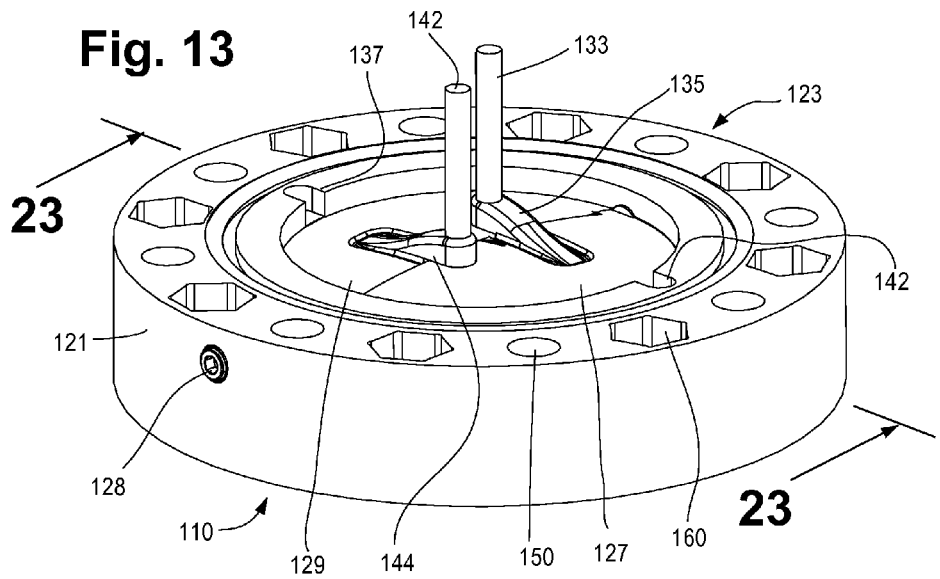

ial pictorial elevational view of a hydrant shear valve which is constructed according to an embodiment, and which is illustrated mounted to a hydrant in fluid communication with a hydrant water supply;

HYDRANT SHEAR VALVE AND METHOD

FIELD OF THE INVENTION

The present invention in general relates to a hydrant shear valve and a method of shutting off the flow of liquid to a hydrant.

BACKGROUND OF THE INVENTION

There is no admission that the background art disclosed in this section legally constitutes prior art.

Water waste and property damage has been caused inadvertently when, for example, a fire hydrant is struck accidentally by a moving motor vehicle and dislodges from the water supply pipe. When a fire hydrant is damaged by a moving vehicle, many thousands of gallons of water per minute may be sprayed into the air under great pressure as high as about sixty feet. This water remains gushing uncontrollably for many minutes such as 30 to 60 minutes, until the fire department manually shuts off an inline valve.

The property damage done to surrounding businesses, homes and other property within a wide radius such as fifty yards, may be conservatively many thousands of dollars as a direct result of flooding. There is also the added cost to the tax payer of digging up and replacing the broken line, not taking into account many thousands of gallons of water, which is becoming a precious commodity.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 12 is a pictorial view of the valve of FIG. 11, illustrating it in its opened position;

FIG. 13 is a pictorial view of the valve of FIG. 11, illustrating it in its closed position;

DETAILED DESCRIPTION OF CERTAIN EMBODIMENTS OF THE INVENTION

Figure 1:
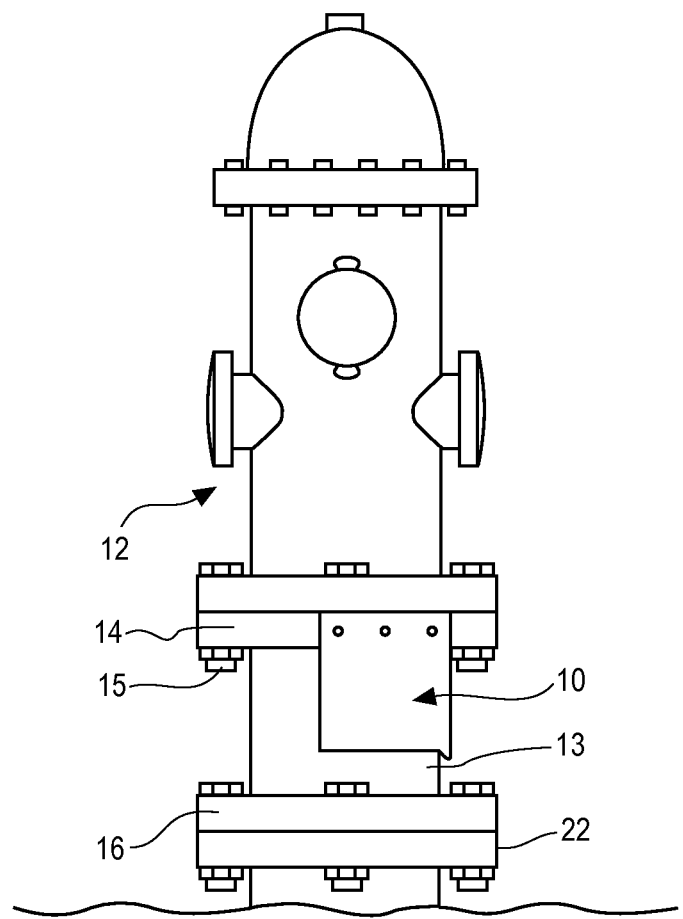
FIG. 1 is a diagrammatic pictorial elevational view of a hydrant shear valve which is constructed according to an embodiment, and which is illustrated mounted to a hydrant in fluid communication with a hydrant water supply.
Figure 2:
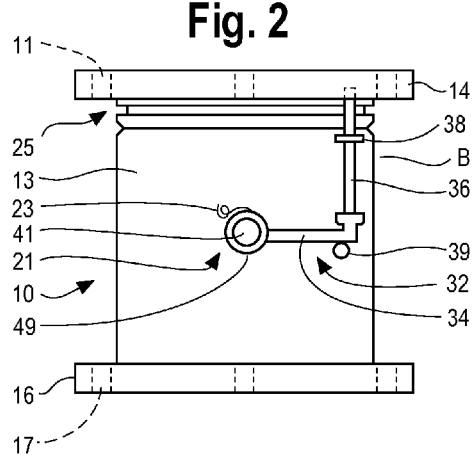
FIG. 2 is an enlarged diagrammatic pictorial elevational view of the hydrant shear valve of FIG. 1.
Figure 3:
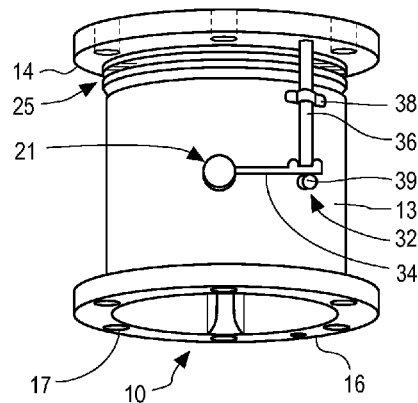
FIG. 3 is a pictorial view of the valve of FIG. 2.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

According to at least one embodiment, a hydrant shear valve for a hydrant may be coupled in fluid communication with a hydrant water supply pipe including a valve body mounted in fluid communication between the hydrant and the water supply pipe. A two-piece valve member is pivotally mounted in the valve body to move between an open position and a closed position. The valve member includes a pair of valve member portions which are disposed overlapping one another axially aligned within the valve body in the open position, and which are disposed in a co-planar configuration in engagement with a valve seat in the closed position.

The hydrant shear valve may include at least one bias member for maintaining releasably the valve member portions in the open position and for permitting the valve member portions to be moved to the closed position under the force of fluid flowing from the supply pipe. Also, at least one frangible actuator breaks away when the hydrant is hit with sufficient impact to free the bias member, to cause the valve member portions to move toward the closed position.

According to at least one embodiment, a method of making a hydrant shear valve for shutting off the flow of fluid to a hydrant includes mounting at least one frangible actuator on a valve body to break away in response to the hydrant receiving a sufficient impact. The method also may include mounting a two-piece valve member in the valve body to close off the flow of fluid to the hydrant in response to the breaking away.

At least one purpose of this hydrant shear valve is to use the water pressure itself to close the valve. In one embodiment, replacing the broken shear valve may merely be a matter of unbolting it from fire hydrant and replacing it.

According to another embodiment, the shear valve is designed to remain in tact, and only broken shear bolts would require replacement.

Referring now to FIGS. 1-10 of the drawings, there is shown a hydrant shear valve 10, which is constructed in accordance with an embodiment, and which is adapted to be mounted in fluid communication below a hydrant 12 and coupled in fluid communication to an upper end of a water supply pipe 22 serving as a source of a hydrant water supply under pressure.

The valve 10 includes a valve body 13 having an upper flange 14 and a lower flange 16, and having a pivotally mounted 2-piece valve member 18 pivotally mounted on a transverse rod or shaft 41 (FIGS. 6 and 8) behind a protective cover plate 19 (FIG. 1) fastened to the upper flange 14. The upper flange 14 includes a series of spaced apart fastener holes such as hole II (FIG. 4) for receiving fasteners such as fastener 15 (FIG. 1). The lower flange 16 includes spaced fastener holes such as hole 17 (FIGS. 2 and 3) for receiving fasteners such as the fastener 15 of FIG. 1.

A bias member or mechanism 21 in the form of a spring 23 (FIG. 2) releasably maintains the valve member 18 in its open position. A frangible actuator or portion 25 of the body 13 is adapted to break away when the hydrant 12 is hit with inadvertent sufficient impact such as when a vehicle (not show) collides with it. The frangible 25 actuator may be annular in shape and may include a square annular serration 27 and a V-shaped annular serration 29 to enable the valve body 13 mounted to the bottom portion of the hydrant 12 by the upper flange 14 to break away or fracture as a result of lateral forces and/or angular forces.

Figure 4:
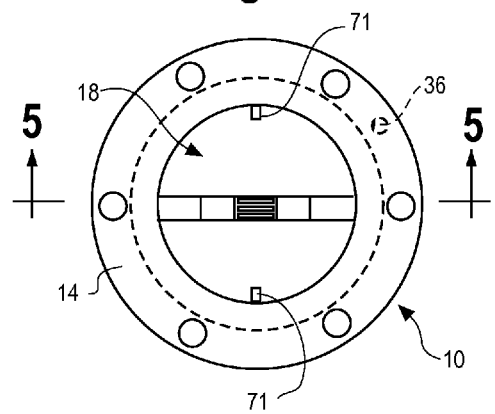
FIG. 4 is a top view of the valve of FIG. 2.
Figure 5:
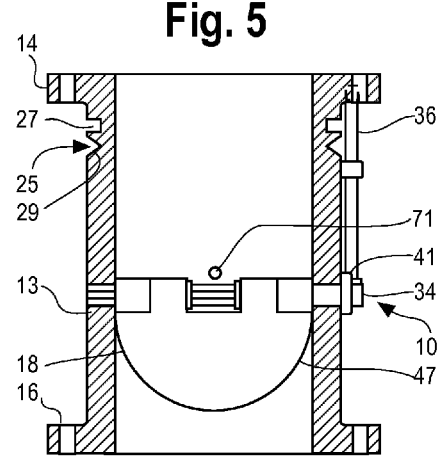
FIG. 5 is a sectional view of the valve of FIG. 4 taken substantially on line 5-5 thereof.
Figure 6:
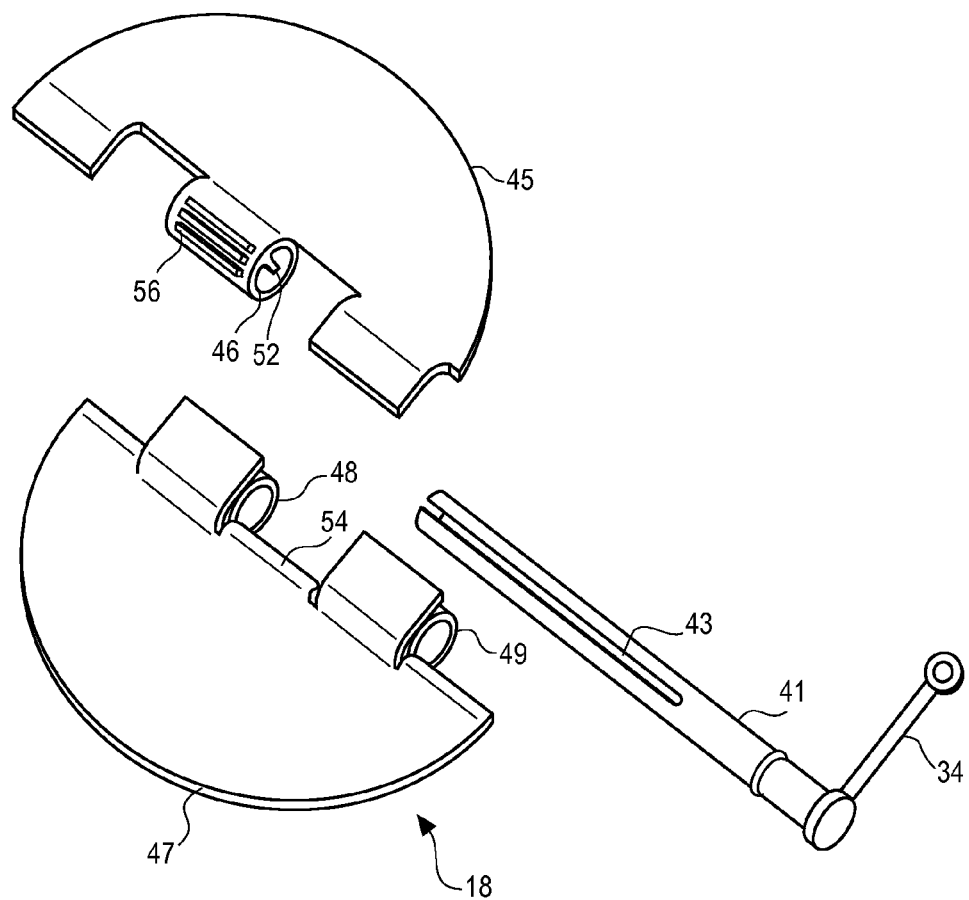
FIG. 6 is an enlarged exploded pictorial view of a component of the valve of FIG. 2.

A trigger mechanism or member generally indicated at 32 includes a transversely extending arm 34 connected to the valve member 18, and an axially extending shear pin 36 connected between the outer end of the arm 34 and fixed at the upper flange 14 to maintain the valve member 18 in its open position engaging stops 71 as best seen in FIGS. 4 and 5 to permit liquid such as water to flow under pressure through the hydrant 12 when used normally such as by fire fighters. A guide bracket 38 receives an intermediate portion of the shear pin 36 to help secure it in place. The arm 34 is normally spring biased by the spring 32 so that its distal end is rigid or pressed against a stop 39. When a sufficient impact on the hydrant 12 occurs, the frangible actuator 25 fractures to break away the upper body portion and the shear pin 36 to free the pin 36 and to permit the spring 23 to cause the arm 34 to rotate in a counterclockwise direction as viewed in FIG. 2 by the shaft 41, whereby the valve member 18 springs toward its closed position as indicated in FIG. 4. The water pressure then continues to move C-shaped valve member portions 45 and 47 of the 2-piece valve member 18 into its co-planar closed position (FIGS. 4, 7 and 10) and is maintained in that position to shut off any further discharge of water, until personnel can turn off a water main supply valve (not shown) so that the shear valve 10 can be removed from the hydrant and replaced with a new shear valve (not shown).

Considering now the valve member 18 in greater detail with reference to FIGS. 4, 5, 6, 7, 8, 9 and 10, the valve member 18 includes the rotatably mounted shaft 41 disposed transversely within the valve body 13 to drive the valve member 18 into its closed position. The shaft 41 includes an axially extending keyway slot 43 secured to a valve member portion 45 having a sleeve 46 which receives the shaft 41 at the keyway 43. The valve member portion 47 cooperates with the valve member portion 45 when disposed in a co-planar configuration to shut off fluid flow within the hydrant shear valve 10. The valve member portion 47 includes a pair of spaced-apart sleeves 48 and 49 for receiving the shaft 41 on opposite sides of the sleeve 46 of the valve member portion 45. The sleeve 46 includes an internal key 52 which fits into the keyway 43 so that when the arm 34 fixed to the shaft 41 rotates in a counterclockwise direction as viewed in FIG. 2 upon impact to the hydrant 12, the valve member portion 45 rotates with the shaft 41.

Figure 7:
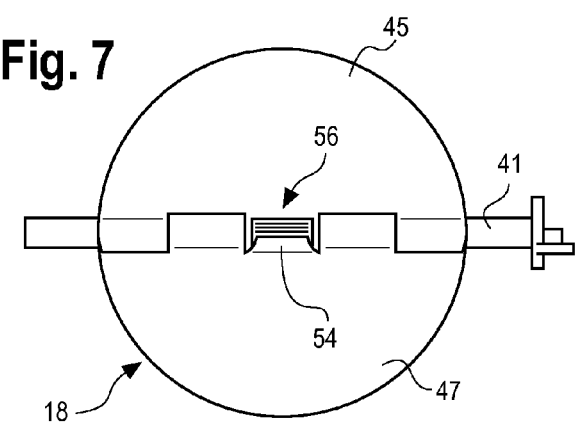
FIG. 7 is an assembled top plan pictorial view of the component of FIG. 6 illustrating the component in its closed position.
Figure 8:
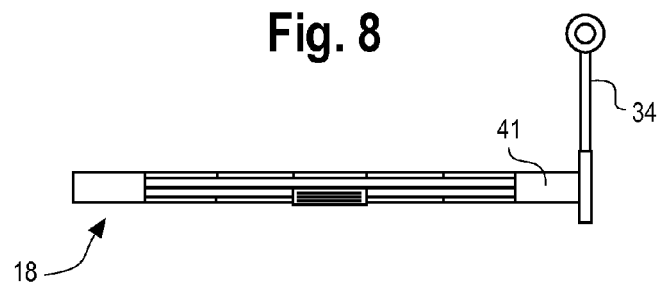
FIG. 8 is an elevational view of the component of FIG. 7.
Figure 9:
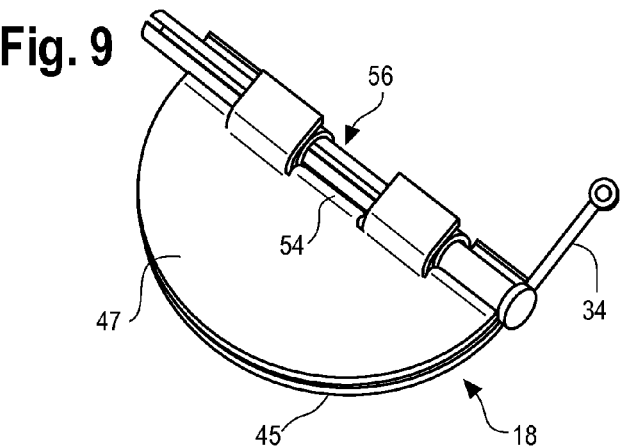
FIG. 9 is a pictorial diagrammatic view of the component of FIG. 7 and illustrated in an open position.
Figure 10:
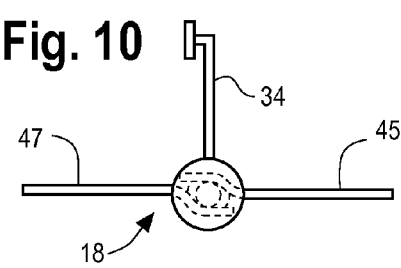
FIG. 10 is a slide elevational view of the component of FIG. 7.

A single spur gear tooth 54 (FIGS. 6, 7, 8 and 9) on the valve member portion 47 between the sleeves 48 and 49 is driven by a quarter revolution spur gear segment 56 on the sleeve 46 of the valve member portion 45 when the shaft 41 rotates to move rotatably the valve member portion 45. In this manner, as the shaft 41 rotates by means of the spring 23, both valve member portions 45 and 47 move from a downwardly depending over lapping position as shown in FIGS. 5 and 9, into a co-planar closed position as indicated in FIGS. 4 and 7.

The hydrant shear valve 10 redirects the break to a specific point on the valve body and water pressure itself is used to close and maintain the valve member 18 in its closed co-planar position until the shear valve 10 is repaired or replaced. Repairing or replacing the broken shear valve 10 is accomplished by unbolting it from the hydrant 12 and the water supply pipe.

Referring now to FIGS. 11 through 23, is shown a hydrant shear valve 110, which is similar to the hydrant shear valve 10, except that substantially all of the mechanisms are internal and the overall construction is more compact. The valve 110 may be fixed in a break away manner to the underside of a fire hydrant 112, and to an upper annular flange 118 of a hydrant water supply pipe 116. In this manner, should the hydrant 112 receive an overwhelming impact such as by an inadvertent collision with a vehicle such as the vehicle 114 of FIG. 11 or for any other reason, the hydrant 112 separates from the shear valve 110 to trip the valve 110 to cause it to shut off water flow from the supply pipe 116.

The shear valve 110 may include an annular circular valve body 121 composed of rigid material such as steel or a suitable composite material. A series of spaced apart fasteners receiving through holes generally indicated at 123 extend axially to permit the valve body 121 to be secured releasably to the hydrant 112 and fixedly to the water supply pipe flange 118 as hereinafter described in greater detail.

Figure 22:
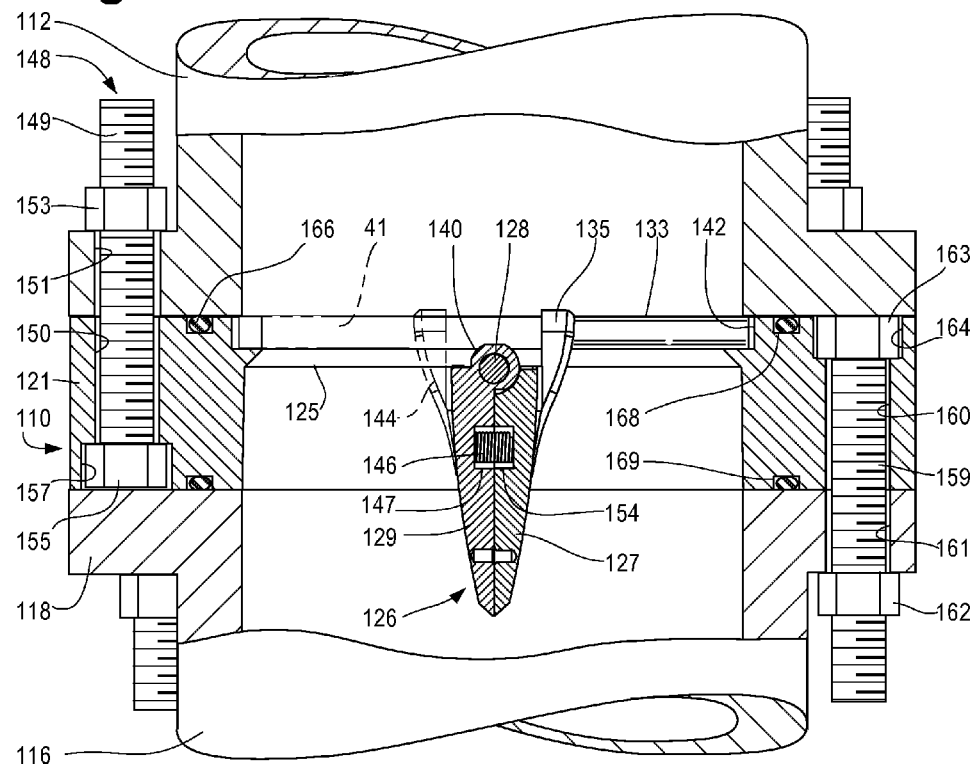
FIG. 22 is a sectional view of the valve taken substantially on line 22-22 of FIG. 12, illustrating the valve in its opened position.
Figure 23:
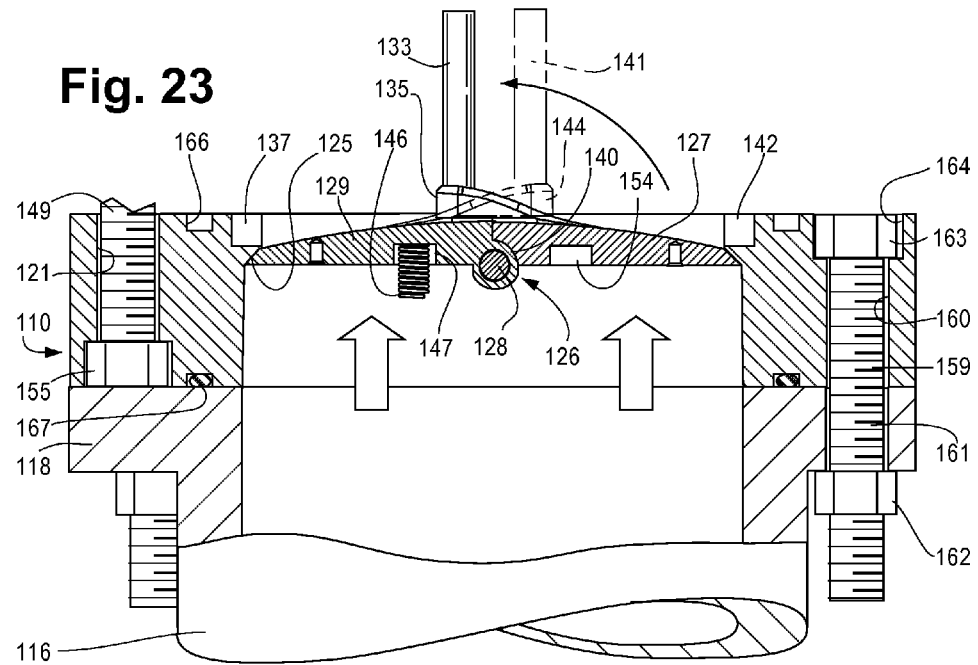
FIG. 23 is a sectional view of the valve taken substantially on line 23-23 of FIG. 13, illustrating the valve in its closed position.

Referring now to FIGS. 22 and 23, an annular valve seat 125 at the upper portion of the valve body 121 is adapted to receive a two-piece valve member 126 to seal off a flow of liquid from the pipe 116. The valve member 126 may include a semi-circular valve member portion 127 and a semi-circular valve member portion 129, which are pivotally mounted on a transverse pivot pin 128. The valve member portions are normally positioned in an overlapping configuration in a valve open position as shown in FIG. 12. When an event occurs that causes the hydrant 112 to be dislodged from the valve 110, the valve member portions 127 and 129 move apart and are caused under the force of the water pressure from the supply pipe 116 to pivot about the pivot pin 128 to move upwardly into sealing engagement with the valve seat 125 as shown in FIG. 13.

Figure 14:
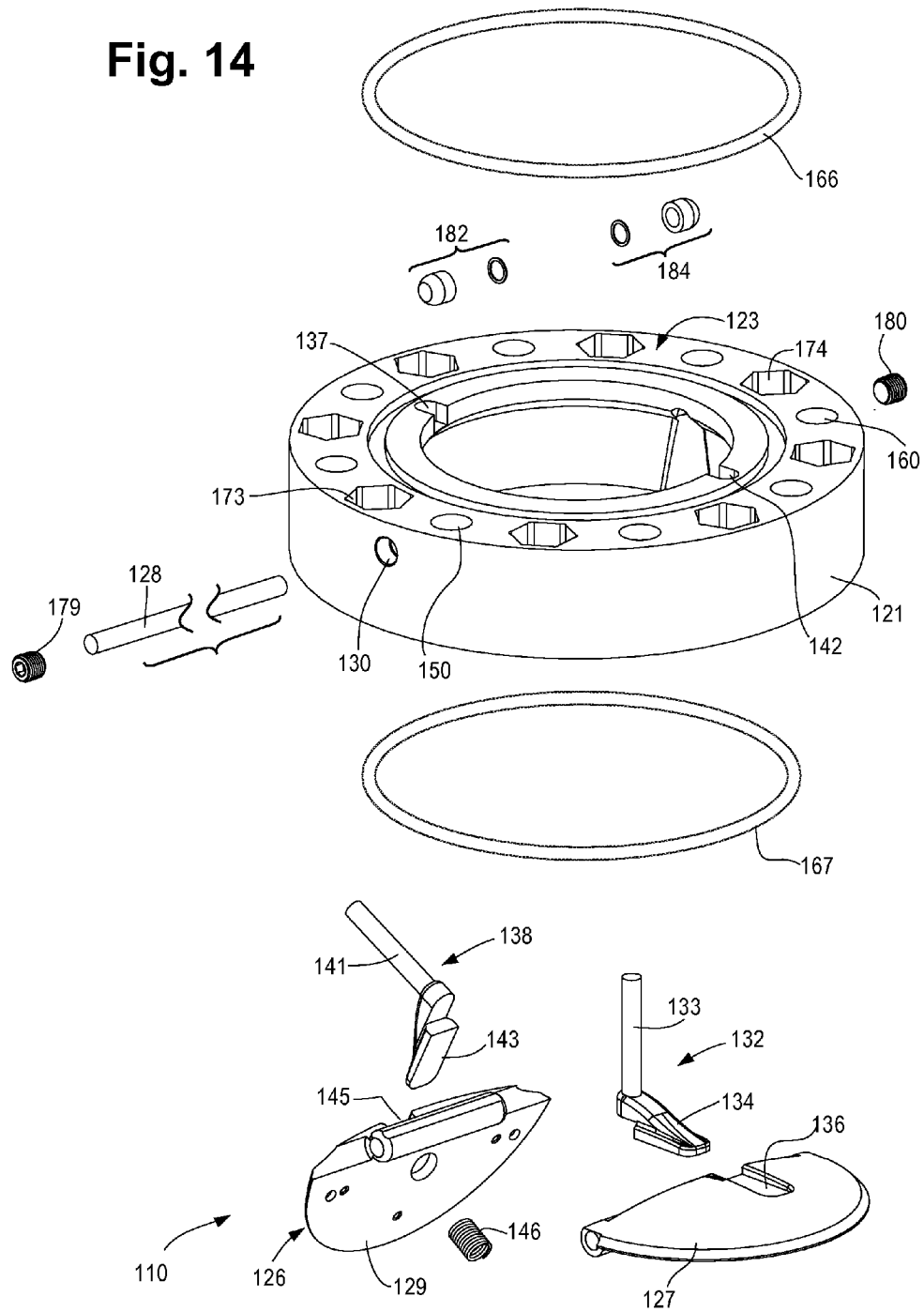
FIG. 14 is an exploded view of the valve of FIG. 11.
Figure 15:
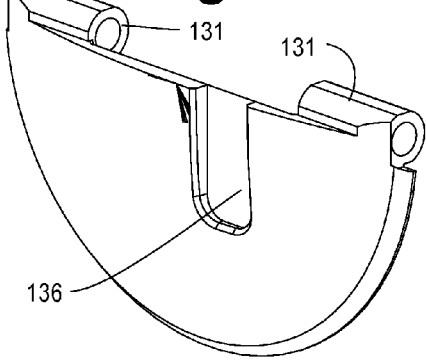
FIGS. 15, 16 and 17 are pictorial views of a two-piece valve member portion of the valve of FIG. 11.
Figure 16:
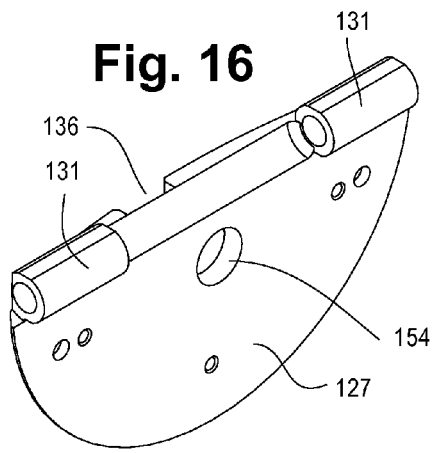
Figure 17:
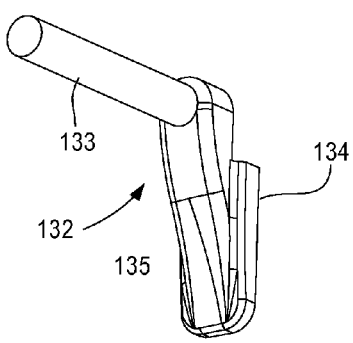
Figure 18:
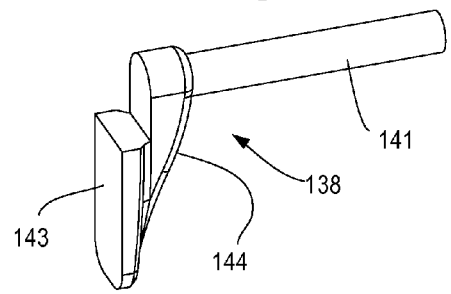
FIGS. 18, 19 and 20 are pictorial views of the other two-piece valve member portion of the valve of FIG. 11.
Figure 19:
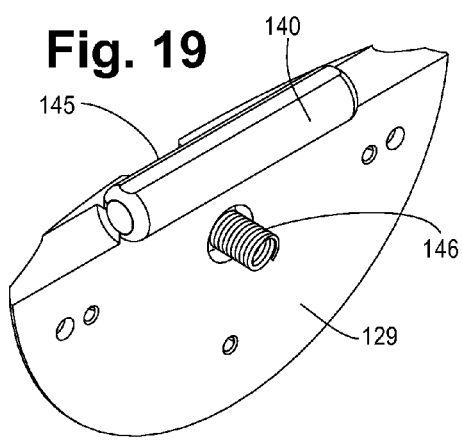

As indicated in FIG. 14, the pivot pin 128 is fixed to the valve body 121 at the opposite ends of the pin 128, which ends fit within a pair of diametrically opposed side holes such as the hole 130 (FIG. 14). A pair of spaced-apart sleeves generally indicated at 131 on the valve portion 127 (FIG. 16) receive therebetween a sleeve 140 on the valve portion 129 so that the sleeves 131 and 140 may receive the pivot pin 128 and pivot thereabout.

As best seen in FIGS. 14-20, an L-shaped bias member 132 is fixed to the valve portion 127 by suitable means such as by welding and grinding off the welds (not shown) and includes an arm or rod 133 extending at right angles to a smoothly contoured foot 135 having a foot pad 134 fixed within a complementary recess 136 of the valve portion 127 (FIG. 14). As best seen in FIGS. 12 and 22, the arm 133 fits into a recess 137 at the top of the valve body 121 so that when the valve body 121 is fixed to the underside of the hydrant 112, the hydrant 112 holds down the arm 133 within its recess 137 so that the valve portion 127 is maintained in the valve open position as shown in FIGS. 12 and 22.

Figure 20:
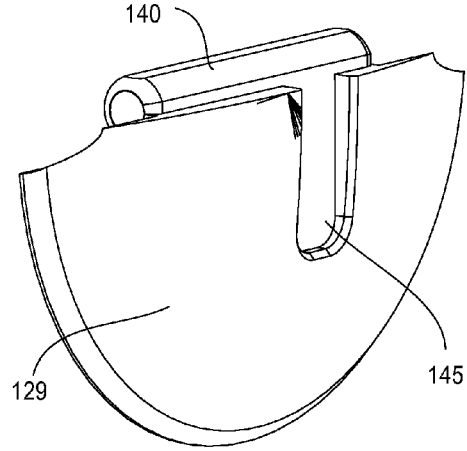
Figure 21:
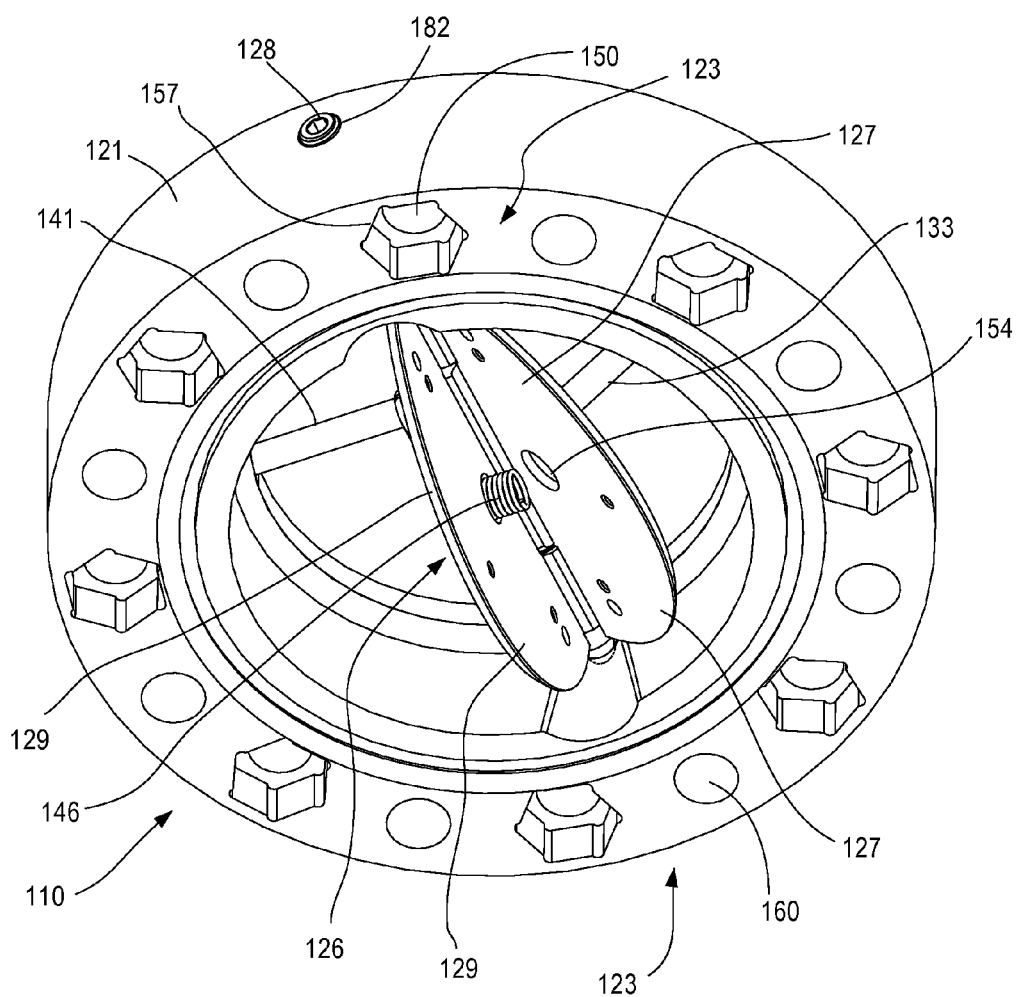
FIG. 21 is a bottom and side pictorial view of the valve of FIG. 11, illustrating it in the process of moving from an open position award a closed position.

Similarly, an L-shaped bias member 138 is similar to the bias member 132 and includes an arm or rod 141 which fits into an upper arm receiving recess 142 for the same purpose as the arm 141. A smoothly contoured foot 144 having a foot pad 143 extends at right angles from the arm 141 and is fixed within a complementary shaped recess 145 in the valve portion 129 as best seen in FIG. 20. Therefore, when the hydrant 112 is inadvertently removed from the valve 110, both arms 133 and 141 become free to pivot out of their respective recesses 137 and 142 and are forced under the water pressure applied via the pipe 116 into the valve closed position in sealing engagement with the valve seat 125, as best seen in FIGS. 13 and 23.

In the valve closed position as best seen in FIG. 22, the outer surfaces of the valve portions 127 and 129 are each smoothly contoured to facilitate streamlined laminar flow of fluid around the valve 126 so that when the hydrant 112 is used during normal operation to deliver water via a hose (not shown) for firefighting or other purposes, the hydrant can function normally.

As shown in FIGS. 22 and 23, a spring 146 is fixed at one of its ends in a spring receiving recess 147 of the valve portion 129 and its opposite end bears against a spring receiving recess 154 of the valve portion 127. In so doing, when an event occurs where the fire hydrant 112 is removed from the valve 110, the spring 146 resiliently urges the valve portions 127 and 129 apart so that flowing water under pressure within the pipe 116 forces the valve portions against the valve seat 125.

At least one frangible actuator such as frangible actuator 148 breaks away when the hydrant is hit with sufficient force or impact to free the bias members 132 and 138 for causing the valve member portions 127 and 129 to move toward the valve closed position. For example, the frangible actuator 148 may include a fastener in the form of a sheer bolt 149 extending through a valve body hole 150 aligned with a hole 151 in an annular hydrant flange 152 and secured in place by a nut 153 (FIGS. 22 and 23). A hex head 155 of the bolt 149 is securely positioned within a hex shaped counter sunk enlarged portion 157 of the hole 150 in the lower portion of the valve body 121.

Figure 11:
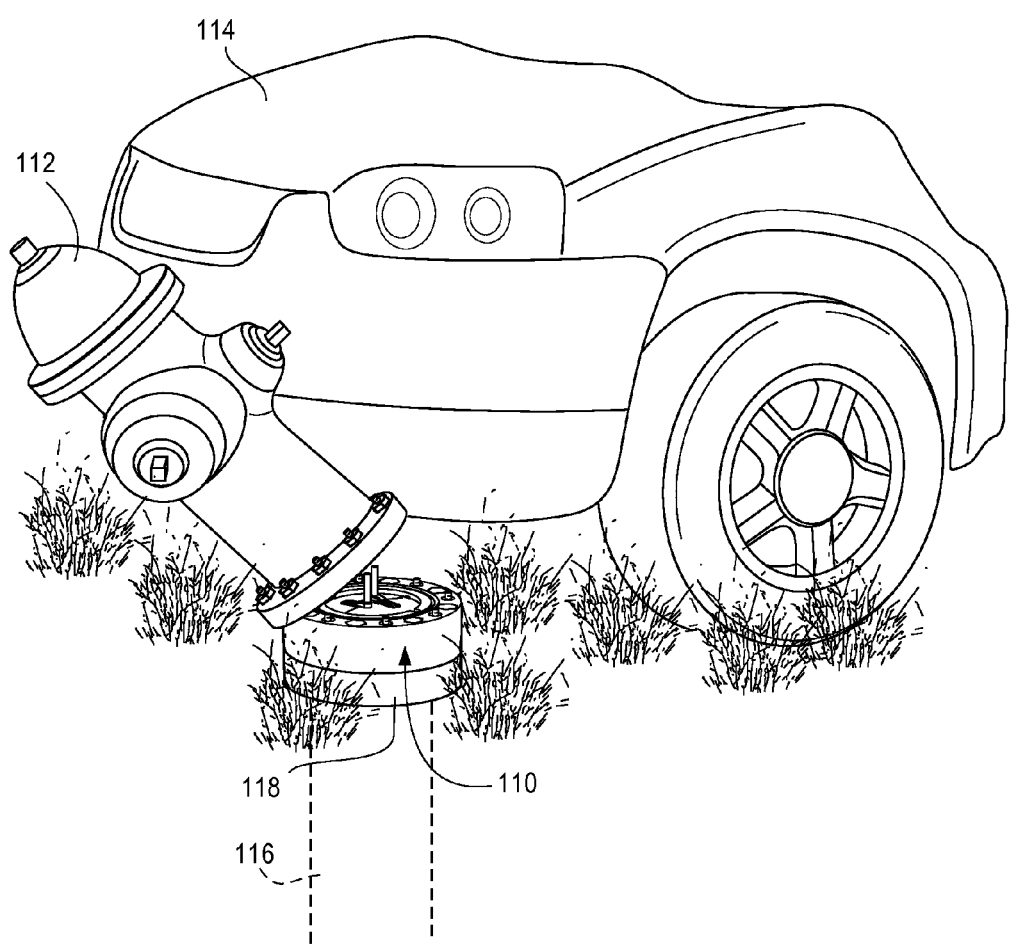
FIG. 11 is a pictorial elevational view of a hydrant shear valve which is also constructed according to another embodiment, and which is illustrated mounted to a hydrant in fluid communication with a hydrant water supply, illustrating the hydrant being knocked over by a vehicle.

According to an embodiment, a series of spaced-apart frangible actuators such as the frangible actuator 148 are provided and extend upwardly from the valve 110 for engaging and secured releasably to the hydrant flange 152 so that normal operation of the hydrant can take place since the valve member 126 is retained in its opened position (FIG. 22). When a hydrant removing event takes place, the shear bolts such as the bolt 149 breakaway as shown in FIG. 23 to free the arms 133 and 141. Additionally, due to the low profile compact figuration of the valve 110, as shown in FIG. 11, the hydrant 112 can be mounted to the water pipe 116 at a customary height above the ground to facilitate hose connections.

Considering now the connection of the valve 110 to the water pipe flange 118 in greater detail, alternating with the sheer bolt receiving holes such as the hole 150, are axially extending holes such as a hole 160 receiving conventional bolt such as a conventional bolt 159 extending through the hole 160 and into a hole 161 in the water pipe flange 118 and secured in place by a nut 162. A hex head 163 of the net 162 is positioned within a hex counter sunk enlarged portion 164 of the hole 160. In this manner, a series of spaced-apart conventional bolts such as the bolt 159 extend from the bottom of the valve 110 and are adapted to be fastened to the water pipe flange 118 in a fixed manner to hold the valve 110 in place during a hydrant removal event. Therefore, as indicated in FIG. 23, when such an event occurs, the shear bolts such as the sheer bolt 149 fractures and breaks away to free the hydrant from the valve 110. Thus, the valve 10 generally remains intact and only the shear bolts require replacement to secure a hydrant to the valve 110. Therefore, the use of the valve 110 is cost effective since a new sheer valve is usually not required after an event.

An upper O ring 166 and a lower O ring 167 fit within respective annular recesses 168 and 169 in the upper portion of the valve body 121 to seal the valve body 121 to the lower portion of the hydrant flange 152 to connect the hydrant 112 to the water pipe 116 in fluid communication through the annular valve body 121. As shown in FIG. 14, pairs of cap nuts and washers 182 and 184 may be used to secure the ends of the pivot pin 128 on the outside of the valve body 121.

Although the invention has been described with reference to the above examples, it will be understood that many modifications and variations are contemplated within the true spirit and scope of the embodiments and claims of the invention as disclosed and claimed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A hydrant shear valve for a hydrant coupled in fluid communication with a hydrant water supply pipe having a pipe flange, comprising:
   a valve body having fastener receiving openings for mounting the valve in fluid communication between the hydrant and the water supply pipe;
   the valve body having a valve seat;
   a two-piece valve member including two separate valve member portions each separately and independently pivotally mounted in the valve body to move independently between open positions and closed positions;
   the separate valve member portions being disposed overlapping one another axially aligned within the valve body in the open position and being disposed in a co-planar configuration in engagement with the valve seat in the closed position;
   a pair of bias members for maintaining releaseably the valve member portions in the open position and for permitting at least one of the valve member portions to be moved toward the closed position under a force of fluid flowing from the supply pipe;

a pair of oppositely disposed recesses in the top portion of the valve body;

the pair of bias members include separate L-shaped bias members having rods for engaging the valve body recesses and each having a foot fixed to one of the valve members;

wherein bias member rods are held down by the hydrant in the valve body recesses when the two-piece valve member is disposed in the open position and are permitted to move freely out of the recesses when the hydrant is at least partially dislodged from the valve body; and at least one actuator for freeing the bias members to permit the valve member portions to move independently toward the closed position under the force of water pressure when the hydrant is hit with sufficient impact.

2. A The hydrant sheer valve according to claim 1, wherein a trigger mechanism releases the valve member to permit the bias member to cause the valve member portions to move to the closed position in response to a frangible actuator breaking away so that fluid is prevented from escaping.

3. The hydrant shear valve according to claim 2, wherein the trigger mechanism includes a shear pin, and the bias member includes a spring.

4. The hydrant shear valve according to claim 1, further including a series of axially extending fastener-receiving counter-sunk holes for mounting the valve between the hydrant and the water supply pipe and for enabling a first plurality of fasteners to extend to a bottom of the hydrant and a second plurality of fasteners to extend to the water supply pipe.

5. The hydrant shear valve according to claim 1, wherein an at least one frangible actuator includes at least one shear fastener.

6. The hydrant shear valve according to claim 1, wherein each valve member portion includes a contoured surface to facilitate fluid flow past the valve member the open position.

7. The hydrant shear valve according to claim 1, further including a spring for resiliently urging the valve member portions away from one another when the valve member portions move toward the closed position.

8. The hydrant shear valve according to claim 1, wherein each foot of the bias members is smoothly contoured.

9. The hydrant shear valve according to claim 8, wherein each foot of the bias members includes a foot pad fixed within a complementary shaped recess in a corresponding one of the valve portions.

10. The hydrant shear valve according to claim 9, wherein each one of the valve portions is smoothly contoured to facilitate streamlined laminar flow of fluid around the valve during normal operation.

11. The hydrant shear valve according to claim 10, wherein each L-shaped bias member has its arm extending at right angles to an smoothly contoured foot.

12. The hydrant shear valve according to claim 11, wherein each valve member portion is semi-circular in shape and are positioned in an overlapping configuration in a valve open position.

13. The hydrant shear valve according to claim 12, wherein each one of the valve portions includes one or more shelves for receiving a pivot pin mounted within the valve body below the valve seat.

14. The hydrant shear valve according to claim 13, a coil spring fixed to one of the valve portions for urging the valve portions apart when they are disposed in their open position.

15. A method of making the hydrant shear valve of claim 1, pivotally mounting the two valve member portions in the valve body below the valve seat.

16. The hydrant shear valve according to claim 1, wherein the valve body recesses are off set with respect to one another so that the arms extend out of the valve body in a parallel spaced apart manner when the valve member is closed.

\* \* \* \* \*

UNITED STATES PATENT AND TRADEMARK OFFICE
CERTIFICATE OF CORRECTION

PATENT NO. : 9,890,866 B2
APPLICATION NO. : 14/788448
DATED : February 13, 2018
INVENTOR(S) : Richard T. Kitchen and Richard D. Traver Page 1 of 1

It is certified that error appears in the above-identified patent and that said Letters Patent is hereby corrected as shown below:

In the Claims

Column 8, Line 3, after "member" insert -- in --.

Signed and Sealed this
Tenth Day of July, 2018

Andrei Iancu
*Director of the United States Patent and Trademark Office*